US010997968B2

(12) United States Patent
Wanas et al.

(10) Patent No.: US 10,997,968 B2
(45) Date of Patent: May 4, 2021

(54) USING DIALOG CONTEXT TO IMPROVE LANGUAGE UNDERSTANDING

(71) Applicant: Microsoft Technology Licensing, LLC, Redmond, WA (US)

(72) Inventors: Nayer Mahmoud Wanas, Giza (EG); Riham Hassan Abdel Moneim Mansour, Redmond, WA (US); Kareem Saied Abdelhamid Yousef, Cairo (EG); Youssef Shahin, Redmond, WA (US); Carol Ishak Girgis Hanna, Cairo (EG); Basma Ayman Mohammed Mohammed Emara, Alexandria (EG)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 87 days.

(21) Appl. No.: 16/398,685

(22) Filed: Apr. 30, 2019

(65) Prior Publication Data
US 2020/0349919 A1   Nov. 5, 2020

(51) Int. Cl.
*G10L 15/22* (2006.01)
*G10L 15/06* (2013.01)
(Continued)

(52) U.S. Cl.
CPC .......... *G10L 15/063* (2013.01); *G06F 40/295* (2020.01); *G10L 15/183* (2013.01); *G10L 15/1815* (2013.01); *G10L 15/22* (2013.01)

(58) Field of Classification Search
CPC ..... G10L 15/22; G10L 15/063; G10L 15/183; G10L 15/26; G10L 15/1822; G10L 13/08;
(Continued)

(56) References Cited

U.S. PATENT DOCUMENTS 7,249,019 B2 *  7/2007  Culy ...................... G10L 15/18
                                                        704/235
8,738,379 B2 *  5/2014  Tur .......................... G10L 15/26
                                                        704/257
(Continued)

OTHER PUBLICATIONS

"International Search Report and Written Opinion Issued in PCT Application No. PCT/US20/026055", dated Aug. 3, 2020, 12 Pages. (MS# 406279-WO-PCT).

*Primary Examiner* — Vijay B Chawan
(74) *Attorney, Agent, or Firm* — Workman Nydegger

(57) ABSTRACT

Described herein is a mechanism for improving the accuracy of a language model interpreting short input utterances. A language model operates in a stateless manner, only ascertaining the intents and/or entities associated with a presented input utterance. To increase the accuracy, two language understanding models are trained. One is trained using only input utterances. The second is trained using input utterance-prior dialog context pairs. The prior dialog context is previous intents and/or entities already determined from the utterances in prior turns of the dialog. When input is received, the language understanding model decides whether the input comprises only an utterance or an utterance and prior dialog context. The appropriate trained machine learning model is selected and the intents and/or entities associated with the input determined by the selected machine learning model.

20 Claims, 9 Drawing Sheets

(51) Int. Cl.
*G06F 40/295* (2020.01)
*G10L 15/18* (2013.01)
*G10L 15/183* (2013.01)

(58) Field of Classification Search
CPC ............... G10L 15/18; G10L 15/1815; G10L 2015/0625; G10L 2015/223; G10L 15/16; G10L 13/00; G10L 17/00; G10L 15/24; G10L 15/30; G06F 40/35; G06F 40/30; G06F 40/40; G06F 40/205; G06F 40/247; G06F 40/274; G06F 40/295; G06F 40/166; G06F 40/284; G06F 40/42; G06F 40/44; G06F 40/47; G06F 40/56
USPC .......... 704/275, 9, 230, 235, 244, 254, 257, 704/270.1, 2, 231, 243, 251
See application file for complete search history.

(56) References Cited

U.S. PATENT DOCUMENTS

| | | | | |
|---|---|---|---|---|
| 8,914,294 B2* | 12/2014 | Di Fabbrizio | .......... | G10L 15/22 704/275 |
| 9,292,492 B2* | 3/2016 | Sarikaya | ............. | G06F 16/3338 |
| 9,454,960 B2* | 9/2016 | Stewart | .................... | G10L 15/26 |
| 9,818,405 B2* | 11/2017 | Arslan | .................. | G06F 40/205 |
| 9,905,222 B2* | 2/2018 | Tur | .................... | H04M 3/4936 |
| 10,475,446 B2* | 11/2019 | Gruber | .................. | G10L 15/183 |
| 10,691,473 B2* | 6/2020 | Karashchuk | .......... | G06F 3/0482 |
| 10,761,866 B2* | 9/2020 | Liu | ....................... | G06N 3/0454 |
| 2004/0030557 A1* | 2/2004 | Culy | ....................... | G10L 15/18 704/270.1 |
| 2010/0100380 A1* | 4/2010 | Tur | ........................ | G10L 15/26 704/244 |
| 2012/0232898 A1* | 9/2012 | Di Fabbrizio | ......... | G10L 15/063 704/235 |
| 2014/0222422 A1* | 8/2014 | Sarikaya | ................. | G06F 40/35 704/231 |
| 2014/0222426 A1* | 8/2014 | Di Fabbrizio | .......... | G10L 15/22 704/243 |
| 2014/0343942 A1* | 11/2014 | Tur | ..................... | H04M 3/4936 704/244 |
| 2015/0179170 A1* | 6/2015 | Sarikaya | ............. | G10L 15/1822 704/275 |
| 2015/0340033 A1* | 11/2015 | Di Fabbrizio | ...... | G10L 15/1815 704/254 |
| 2015/0370787 A1* | 12/2015 | Akbacak | ................ | G06F 40/44 704/2 |
| 2016/0329047 A1* | 11/2016 | Tur | .................... | G10L 15/1822 |
| 2017/0212884 A1* | 7/2017 | Kim | ........................ | G06F 40/40 |
| 2017/0270921 A1* | 9/2017 | Arslan | .................. | G06F 40/205 |
| 2017/0372200 A1* | 12/2017 | Chen | ................... | G10L 15/22 |
| 2018/0012597 A1* | 1/2018 | Mathias | ................ | G06F 40/284 |
| 2018/0212904 A1* | 7/2018 | Smullen | ................ | H04L 63/18 |
| 2019/0066668 A1* | 2/2019 | Lin | ....................... | G06F 40/295 |
| 2019/0325081 A1* | 10/2019 | Liu | ........................ | G06F 40/40 |
| 2019/0340200 A1* | 11/2019 | Coimbra | ............. | G10L 13/02 |
| 2020/0219491 A1* | 7/2020 | Jarosz | ..................... | G10L 15/22 |
| 2020/0251091 A1* | 8/2020 | Zhao | ........................ | G06N 3/08 |

\* cited by examiner

USING DIALOG CONTEXT TO IMPROVE LANGUAGE UNDERSTANDING

FIELD

This application relates generally to dialog systems. More specifically, this application relates to improvements in language understanding models that are utilized in dialog systems.

BACKGROUND

Dialog systems that communicate with users using natural language phrasing utilize language understanding models to discern the intent of a user so that a proper response can be given, or proper actions can be taken. Often times, the user will provide short utterances to the dialog system, which are passed along to the language understanding model for interpretation. Short utterances are often highly ambiguous and the discovery of the intent of an utterance is difficult.

It is within this context that the present embodiments arise.

DETAILED DESCRIPTION

Figure 1:
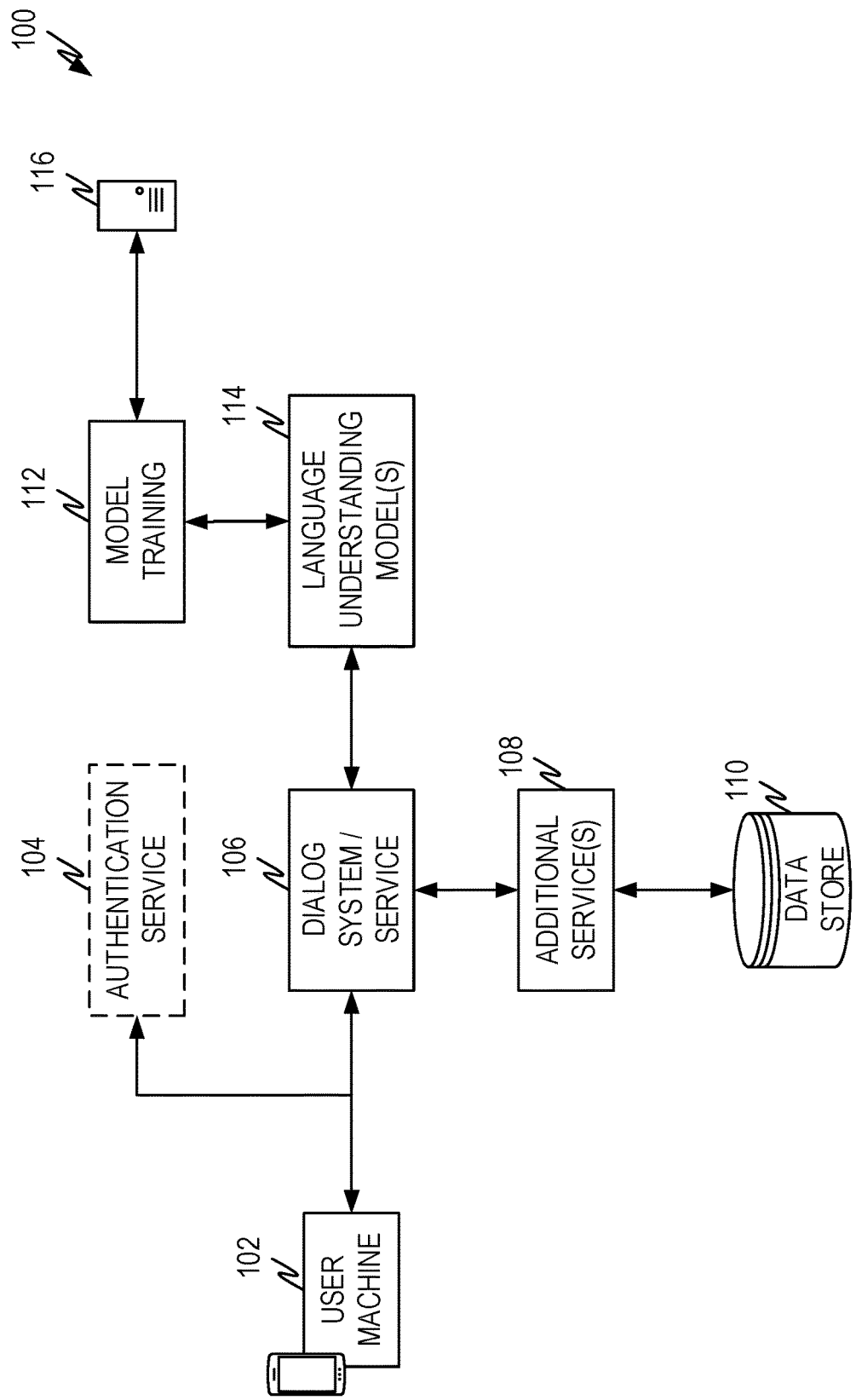
FIG. 1 illustrates an example architecture of a representative dialog system according to some aspects of the present disclosure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Natural language interaction with dialog systems such as digital assistants, chat bots, automation systems, and other such systems, is now common place. The natural language input received from a user or other system is referred to in this disclosure as an utterance. An utterance can have a variety of formats such as verbal, textual, and so forth. In this disclosure, textual utterances will be used for illustration purposes, but the disclosure is not so limited and any format of utterance will be encompassed by the disclosure.

The dialog system receives an utterance and returns a reply to the user and/or initiates a desired action on behalf of the user. For example, a user may utter "turn on the lights" and expect that a digital assistant, automation system, or other such system will turn the lights on. As another example, a user may input "tell me about last nights baseball scores" and expect that the scores from last night's games will be displayed.

These dialog systems use a language understanding model to detect what the user wants. The language understanding model receives an utterance and returns an intent and/or entity. The language understanding model operates in a stateless manner, evaluating each utterance and returning each intent and/or entity based solely on the received utterance. As used herein, an "intent" is what the user wants to do. An "entity" is information related to the intent. For example, if the utterance is "order me a pizza" the intent is to order goods or services. The entity "pizza" is an entity and is what the user wants to order. As another example, if the utterance is "play the latest King Arthur trailer" the intent is to view media. The entities are "trailer" which it the type of media the user desires to view and "King Arthur" is the particular trailer the user desires to view. While there is generally only one intent associated with an utterance, there can be zero or more entities associated with an utterance.

Often users give short utterances, expecting the dialog system to understand what the user wants. However, short utterances are often highly ambiguous and they can be very difficult for the dialog system and language model to determine the intent of the utterance. For example, consider the utterance "Chicago" could mean many different things and it may be extremely difficult to determine an intent from such a short utterance.

Consider the following dialog exchange between a user and a dialog system:

| | Utterance | Prompt |
|---|---|---|
| U1 | Book me a flight next Tuesday | |
| R1 | | Where would you like to travel? |
| U2 | Redmond, Washington | |
| R2 | | Where are you traveling from? |
| U3 | Cairo, Egypt | |

Since the language understanding model operates in a stateless manner, each utterance stands on its own and the intents and/or entities of the utterance evaluated only on the current input utterance. Thus, although the language understanding model may be able to determine that the intent in utterance U1 is to book a flight, the intent for utterance U2 and U3 would likely come back as "none" since the utterance contains only cities and states or countries and the language understanding model would be unable to discern any intent in the utterances.

Embodiments of the present disclosure utilize prior dialog context to help disambiguate intent and/or entities in an utterance. In the context of this disclosure, prior dialog context means prior intents and/or entities from the dialog. The language understanding models in embodiments of the present disclosure can be trained using utterance-context pairs. In some embodiments, the utterance-context pairs are an input utterance and one or more prior intents, an input utterance and one or more prior entities, and/or an input utterance and one or more prior intents and one or more prior entities.

When the language understanding model receives prior dialog context along with the utterance, the language model utilizes features from both the utterance and prior dialog context in order to improve the ability of the language understanding model to be able to disambiguate utterances and increase the accuracy of intent and/or entity detection.

DESCRIPTION

Embodiments of the present disclosure can apply to a wide variety of systems whenever machine recognition comprises textual clues in the source image. Example systems in which embodiments of the present disclosure can apply include, but are not limited to, visual search systems, visual recognition systems, and any system where automated recognition of an item can be used to drive further processing such as an automated checkout system. All these are collectively referred to as recognition systems herein.
Representative Dialog System Architecture FIG. 1 illustrates an example architecture 100 of a representative dialog system 106 according to some aspects of the present disclosure. The dialog systems and/or dialog services of the present disclosure are simply referred to as a dialog system for ease of discussion. The representative architecture 100 can be applied to a variety of various situations and contexts.

As a first example, the architecture 100 can bean informational chatbot. In this context, a user interacts with the informational chatbot via a user device 102 such as a mobile phone, a computer (laptop, desktop, etc.), a tablet system, a gaming system, and/or so forth. In some contexts, the user may be required to authenticate through an authentication service 104 prior to accessing the informational chatbot. The authentication service 104 performs authentication and/or authorization of the user to ensure the user is entitled to access the chatbot, customize the chatbot to the user, and/or for other purposes.

Once the user has been authenticated and/or authorization checked, the user is allowed to access the dialog system 106, which in this example is an informational chatbot, which answers questions, provides information to the user, and so forth.

The user can ask the dialog system 106 questions within the domains that the chatbot covers. For example, the dialog system 106 can provide assistance that helps the user understand what types of utterances can be effectively answered by the dialog system.

Upon receiving an utterance, the dialog system 106 submits the utterance and/or prior dialog context to the language understanding models 114 as described herein. The language understanding model returns the intents and/or entities corresponding to the utterance.

The dialog system 106 evaluates the intent and/or entities and utilizes its own resources and/or the resources of additional services 108 and/or data 110 to formulate a proper prompt and return it to the user.

As an example, suppose the chatbot is designed to help programmers in a particular programming environment. The user may submit a question such as "tell me about the addExample API." The dialog system 106 can pass the utterance to the language understanding model 114 and the language understanding model 114 can return an intent such as "RetrieveAPI" and the entity "addExample."

The dialog system 106 will understand what the user desires and retrieve information about the "addExample" API either directly from a data store 110 or via another service 108. The dialog system 106 formulates the prompt giving the details of the "addExample" API and returns it to the user.

In another example, the dialog system 106 can be a digital assistant that can retrieve information and/or accomplish tasks on behalf of the user through various additional services 108, such as calendaring services, scheduling services, purchasing services, and/or any other type of service. In such an example, the dialog system 106 would interact with the language understanding model 114 in much the same way as previously described.

In yet another example, the dialog system can be an automation system or digital assistant that can influence the user's environment by turning on/off lights, adjusting the temperature, and other such tasks. In this situation, the additional services 108 may include a hub or other IoT (Internet of Things) device interface and can effectuate the user's intent by interacting with the hub and/or IoT device interface.

These examples represent a small fraction of the contexts in which the architecture of FIG. 1 can be used. In all contexts, the various aspects such as the dialog system 106, language understanding model 114, additional services 108 and/or data store 110 can be integrated into a single system, can utilize one or more services to implement one or more of the aspects, and/or combinations thereof. For example, Microsoft® provides online services for chatbots, language understanding models, and/or other services that can be used to implement one or more of the illustrated aspects.

Figure 2:
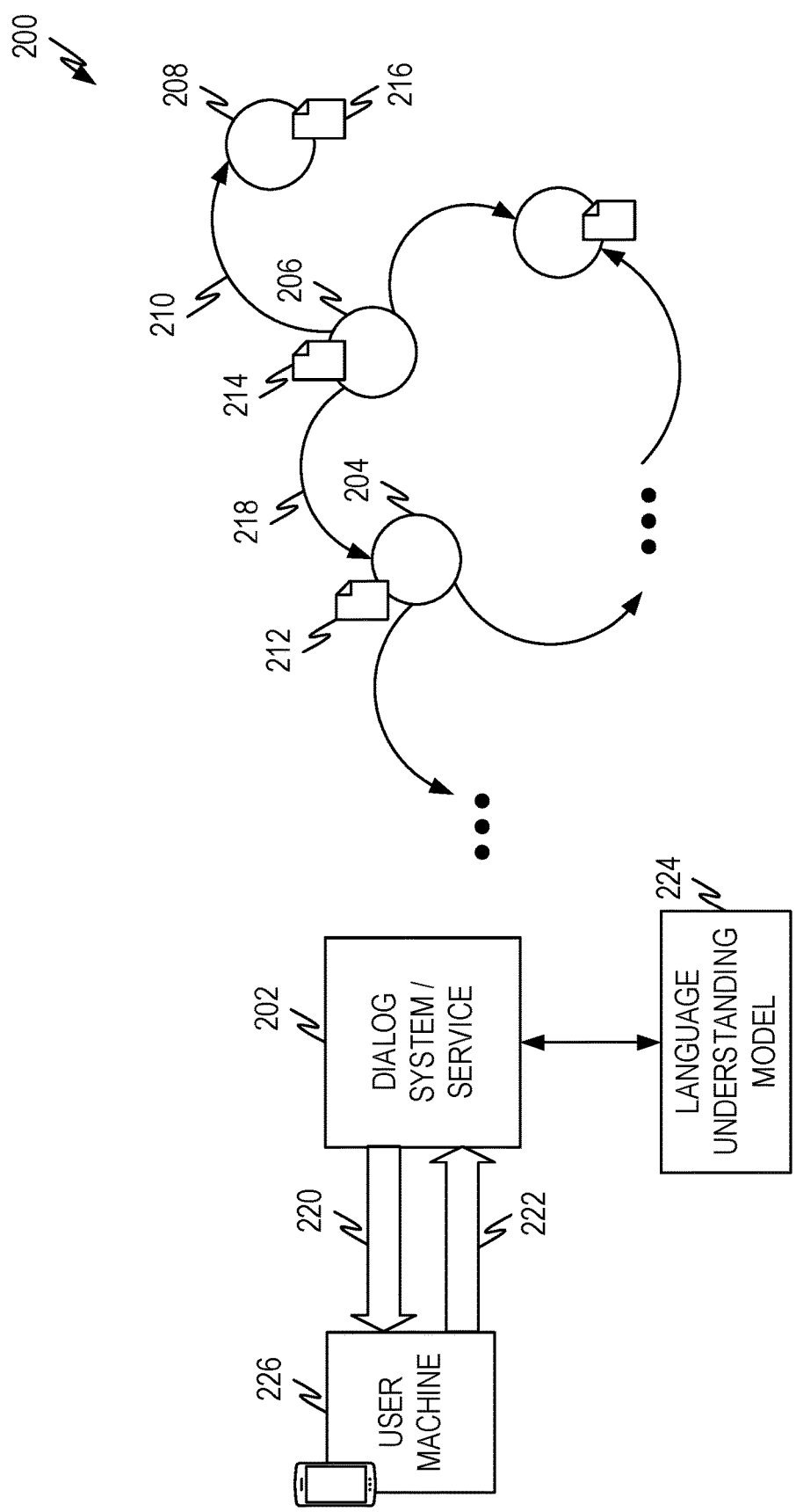
FIG. 2 illustrates an example diagram depicting a dialog system and language model interaction according to some aspects of the present disclosure.

The language understanding model 114 is trained via a model training process 112 as described herein. As described below, a developer can utilize a developer system 116 to submit model training data to a model training process 112. The language understanding model 114 is then trained by the model training process 112 utilizing the training data.
Dialog System-Language Model Interaction FIG. 2 illustrates an example diagram depicting a dialog system and language model interaction 200 according to some aspects of the present disclosure. Example dialog systems 202 include a digital assistant or a chatbot or another such system which receives natural language input from a user via a user machine 226 and responds to the user and/or initiates action(s) on behalf of the user as discussed herein. These dialog systems 202 interact with a user by receiving user requests 222, providing prompts to the user 220, and/or performing actions on behalf of a user. At a high level, the dialog system 202 receives information 222 and, based on that information as well as other information in some instances formulates one or more prompts 220 and/or performs actions on behalf of the user. Thus, the sequence of a conversation can be viewed as a network map, with each node representing a current state of the conversation and moving from one node to another based on user input and/or other information. The state of the conversation can be based on the prior request/prompts as well as the input provided by the user.

The input from the user 222 (e.g., request) an utterance. In order to formulate a prompt 220 and/or initiate action on behalf of the user, the dialog system 202 uses a language understanding model 224 as described herein. While the current state of the conversation is possibly dependent upon past request/prompts, past conversation state, and so forth, the language understanding model 224 operates in a stateless manner. The current natural language input 222 is presented to the language understanding model 224 and the language understanding model 224 responds with a data structure that comprises the intent (if any) and entities (if any) of the utterance as understood by the language understanding model. In some embodiments the data structure also comprises a confidence level of the intent and/or entities.

As an example, suppose the user provides the natural language input "Book me a flight to Cairo." The language understanding model 224 can evaluate the input and provide a data structure that comprises a set of item-value pairs. For example, the item-value pairs can comprise one or more of:
- Query—query text (i.e., the text of the utterance)
- Top scoring intent—intent (i.e., the intent with the top score)
- Top scoring intent score—score (i.e., the score associated with the top scoring intent)
- List of other intents along with their corresponding scores.
- A list of entities found in the input along with their entity type, entity scores, and so forth These can be encoded into one or more data structures. For example, for the request "Book me a flight to Cairo" the data structure can comprise one or more of:

```
{
    "query": "Book me a flight to Cairo",
    "topScoringIntent": {
        "intent": "BookFlight",
        "score": 0.9887482
    },
    "intents": [
        {
            "intent": "BookFlight",
            "score": 0.9887482
        },
        {
            "intent": "None",
            "score": 0.04272597
        },
        {
            "intent": "LocationFinder",
            "score": 0.0125702191
        },
        {
            "intent": "Reminder",
            "score": 0.00375502417
        },
        {
            "intent": "FoodOrder",
            "score": 3.765154E-07
        },
    ],
    "entities": [
        {
            "entity": "cairo",
            "type": "Location",
            "startIndex": 20,
            "endIndex": 24,
            "score": 0.956781447
        }
    ]
}
```

In the above data structure, the startIndex and endIndex are the character positions in the input utterance that correspond to the beginning and ending of the corresponding entity.

As an example of how the various nodes of the conversation map are traversed, consider that the node 206 represents the current (or source) node of a conversation. The parameters of the current state, including whatever prompt is sent to the user is represented by 214. Based on the user response and/or other information (210, 218), the dialog system will move to either destination node 204, displaying a prompt and having parameters 212 or move to destination node 208, with its associated prompt/parameters 216. The destination node becomes the new source node and the process repeats for the duration of the conversation. Over time, as the conversation proceeds, a conversation map from the dialog system with each node in the map having a set of parameters will be traversed.

Using Prior Dialog Context

Figure 3:
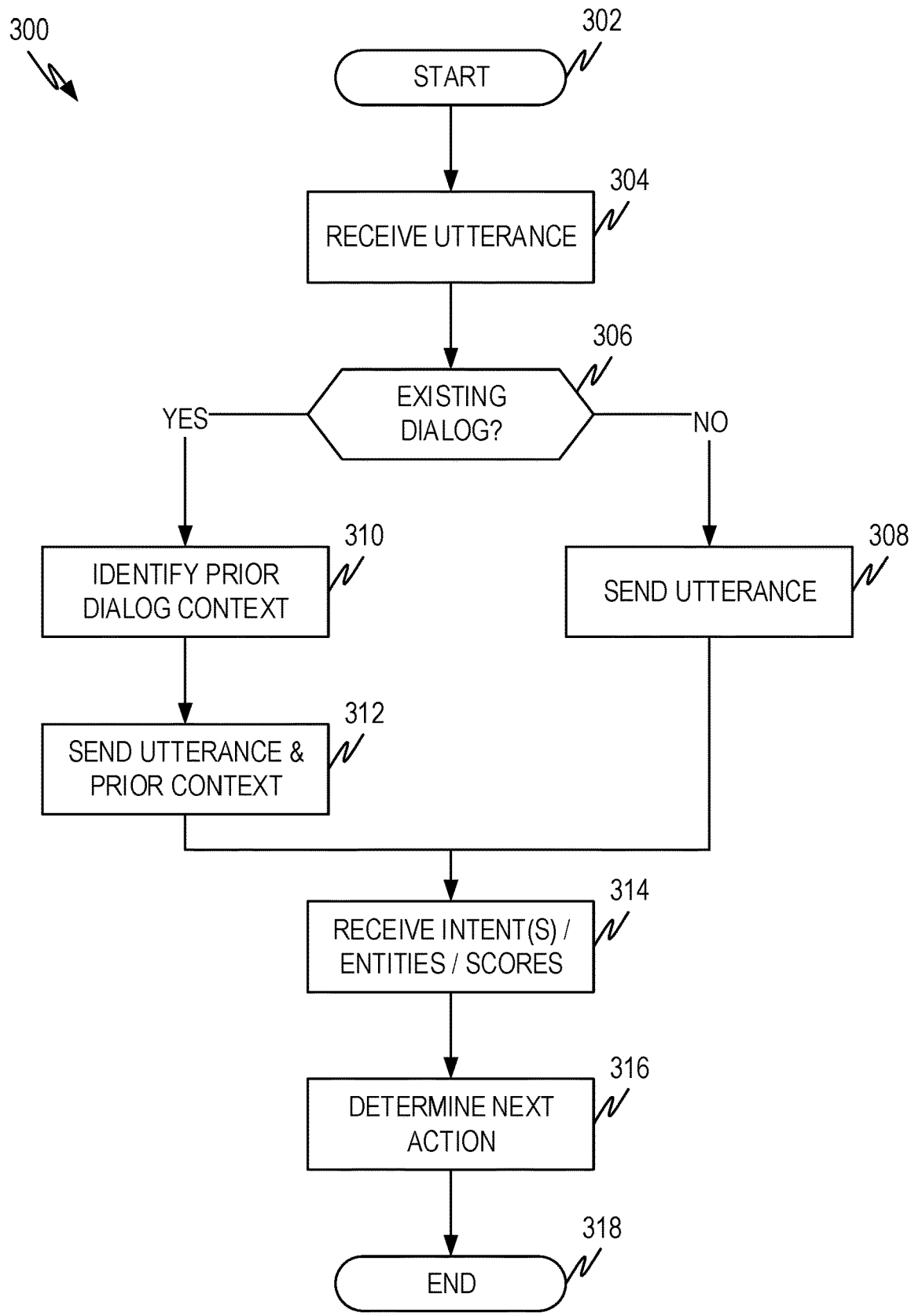
FIG. 3 illustrates an example flow diagram for using prior dialog context according to some aspects of the present disclosure.

FIG. 3 illustrates an example flow diagram 300 for using prior dialog context according to some aspects of the present disclosure. This method can be implemented, for example, by the dialog systems of the present disclosure. The method begins at operation 302 and proceeds to operation 304 where an utterance is received from a user or other system.

In operation 306 the dialog system can attempt to determine whether the utterance is part of an existing dialog. This can be accomplished by considering one or more factors either as a set of rules or as inputs into a machine learning or other model that combines the factors into a probability, or some combination thereof. For example, factors such as length of time from the prior utterance and/or prompt, whether the system has received the utterance in response to a prompt that is part of an existing dialog, whether the utterance is in response to any prompt or not, whether a prior dialog has been closed, and so forth can indicate whether a received utterance is likely to be part of an existing dialog or whether the received utterance is not part of an existing dialog. To explain these factors further:
- If the utterance is received in response to a prompt, the utterance may be more likely to be part of the dialog which generated the prompt.
- If the utterance was not received in response to a prompt, the utterance may be more likely to not be part of an existing dialog.
- As the time between a prompt and utterance increases (decreases), the likelihood that the received utterance is part of the dialog that generated the prompt may decrease (increase).
- As the time between utterances increases (decreases), the likelihood that the received utterance is part of the same dialog as the previous utterance may decrease (increase).
- If the dialog system has no dialogs in progress (e.g., the current state of a conversation map is not part of any dialog or there is no current state of a conversation), the likelihood that the received utterance is part of an existing dialog decreases (the likelihood that the received utterance is part of a new dialog increases).

Thus, the dialog system can either have a set of rules such as the above, or can input a combination of factors into a trained machine learning model or other type of model, or some combination thereof, in order to ascertain the likelihood that the utterance is part of an existing dialog or a new dialog. Since there are only two choices (the utterance is part of an existing dialog or the utterance is part of a new dialog), the two likelihoods are related, and the system can utilize either of these likelihoods to take action. Comparing the desired likelihood to a threshold can allow the system to make a choice as to whether the received utterance is part of an existing dialog or not.

If the utterance is part of an existing dialog, the method proceeds to operation 310 where the system identifies the prior dialog context. As noted herein, the prior dialog context can comprise one or more intents, one or more entities, or any combination thereof.

The system then sends the utterance and prior dialog context to the language understanding model in operation 312.

If, on the other hand, the system determines that the received utterance is not part of an existing dialog, the method proceeds to operation 308 and the utterance (without prior dialog context) is sent to the language understanding model.

The dialog system receives any intents and/or utterances associated with received utterance or received utterance and prior dialog context from the language understanding model in operation 314 as described herein.

Based on the intents and/or entities, the dialog system determines what the next action should be based in its conversation state, internal programming, known information and/or so forth in operation 316. The method terminates in operation 318.

An example can help illustrate how the method of FIG. 3 operates. As noted in FIG. 2, the dialog system has or creates a conversation map during a dialog with the user. Consider the example of booking a flight for the user. The user may initiate this action by an utterance that indicates to the dialog system that a flight should be booked. For example, an initial utterance which initiates the booking of a flight can be one or more of:

I want to travel to Cairo;
Book me a flight;
I need to get to Cairo for a meeting next Tuesday;
Next Tuesday would be a great time to visit Cairo;
or any number of similar utterances. The dialog system can submit the utterance to the language understanding model and receive in return an intent indicating the user wants to book a flight and any entities contained in the utterance. Some of the utterances above have one or more entities and some do not.

Once the dialog system understands that the user wants to book a flight, certain information needs to be collected before the action can be initiated and/or completed. In the example of booking a flight, the dialog system would need to know, for example:

The originating city (where the user wants to fly from);
The destination city (where the user wants to fly to);
The name of the individuals traveling;
The dates of travel; and
Other information such as which airport to use if a city has multiple airports, traveler details, seat preferences, class of service, preferred airlines, frequent flyer numbers, and so forth.

Not all such information may need to be collected, but there is a minimum set of information that the dialog system would need before travel options can be identified and presented to a user. Suppose this minimum set of data included the originating city, the destination city, and the dates of travel. The dialog system may be programmed so that the user is prompted to provide the minimum set of data and then present some options to the user. In such a situation, the dialog may proceed as follows:

| Utterance | Prompt |
|---|---|
| U1 Book me a flight next Tuesday | |
| R1 | Where would you like to travel? |
| U2 Redmond, Washington | |
| R2 | Where are you traveling from? |
| U3 Cairo, Egypt | |

The dialog system receives utterance U1 at operation 304. In operation 306 the dialog system determines whether the utterance is part of an existing dialog. Since the dialog system has no current dialog state, and since the utterance was not received in response to a dialog prompt (or was received in response to a general prompt such as "how can I help today?"), the system concludes that the utterance is not part of any existing dialog and proceeds to operation 308 and submits the utterance to the language understanding model.

At operation 314, the dialog system receives an intent (BookFlight) and entity (date: Tuesday). The dialog system identifies the missing information needed to effectuate the user intent (in this case the destination and source cities) from its internal conversation maps and in operation 316 generates the prompt R1 "where would you like to travel?" and presents it to the user.

On the next turn of the dialog, the utterance "Redmond, Wash." is received (utterance U2). This time, the dialog system determines that the utterance is part of an existing dialog in operation 306 because the utterance was received in response to a prompt that was part of an existing dialog. Thus, the dialog system proceeds to operation 310 and identifies "BookFlight" as the prior dialog context.

In operation 312 the "BookFlight" intent as well as the utterance "Redmond, Wash." is sent to the language understanding model. In response, the language understanding model can identify the existing intent "BookFlight" and the entities of the utterance. "city: Redmond" and "state: Washington" which are received by the dialog system in operation 314.

Since the prompt was asking for destination city, the dialog system can slot the city and state into the destination city entity in operation 316 and then prompt for the remaining missing information with prompt R2: "Where are you traveling from?"

The process repeats substantially as described above with the received utterance U3 "Cairo Egypt" being identified as part of the same dialog in operation 306 and the prior dialog context of "BookFlight" being passed to the language understanding model and the intent "BookFlight" and entities city: Cairo and Country: Egypt being identified in the utterance.

At operation 316, the dialog system should have all the information it needs to present some travel choices to the user, in accord with the representative example.

Although not shown in FIG. 3, one option for the dialog system is to present both the utterance with the prior dialog context and the utterance alone to the language understanding model and then evaluate the intents and/or entities that are returned and make a decision as to whether the utterance is part of the prior dialog or not. This can be implemented in several ways. For example, if the dialog system cannot decide (e.g., the likelihoods are "too close to call"), the factors considered point to both results (e.g., the a prompt that is part of a dialog was sent and the utterance was received in response to the prompt, but the time between prompt and utterance would otherwise indicate that the two are not related), and/or combinations thereof, and/or for other reasons, the dialog system can then submit both. This would turn operation 306 from a binary decision (yes, no) to a trinary decision (yes, no, maybe) and the "maybe" path would be to submit both the utterance alone and the utterance-prior dialog context pair to the language understanding model. The system can then use various criteria to decide when to take the "yes" path, when to take the "no" path, and when to take the "maybe" path.

In still another embodiment, the dialog system can submit both the utterance alone and the utterance-prior dialog context pair to the language understanding model based on some other criteria. In one representative example, the dialog system can always pick either the "yes" path. In another representative example, the dialog system can always pick the "maybe" path.

Training the Language Understanding Models

Figure 4:
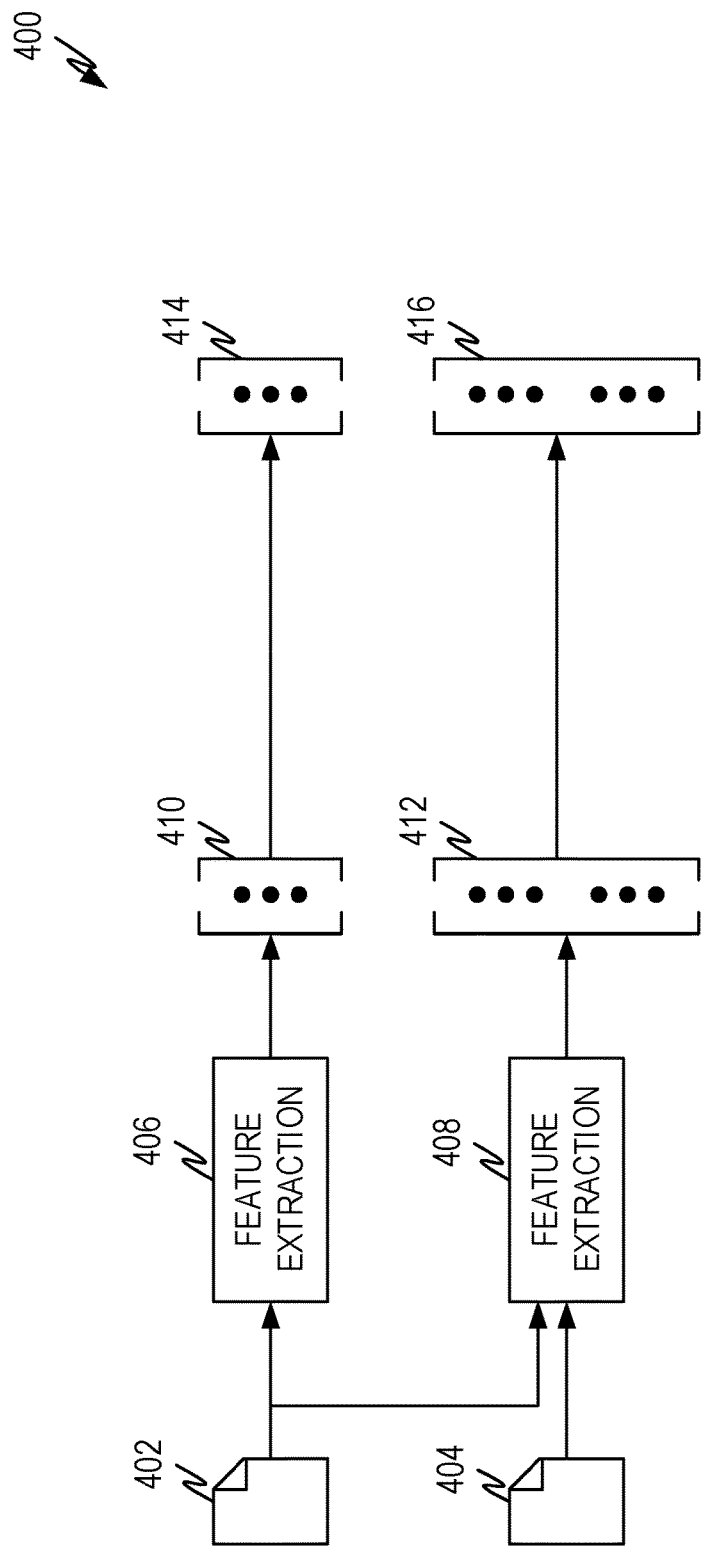
FIG. 4 illustrates an example of deriving training data according to some aspects of the present disclosure.

FIG. 4 illustrates an example 400 of deriving training data according to some aspects of the present disclosure. As discussed herein, the language understanding model can include one or more machine learning models that are trained using training data. To train a model to extract intents and entities from utterances alone, a set of example utterances 402 are collected. The example utterances 402 can be collected in several ways as discussed herein.

Operation 406 can examine the example utterances 402 one by one and extract features from an example utterance and assemble the features into a training vector 410 that corresponds to the example utterance. In this way a collection of training vectors 414 are extracted from the example utterances 402.

Feature extraction operation 406 can extract features in a variety of ways. In one embodiment, stop words (e.g., common words that convey little or no meaning like articles, "a", "an", "the" etc.) can be removed and the remaining words can be assembled into a training vector. In other embodiments, other mechanisms can be used to extract features. For example, words can be stemmed, n-grams can be extracted from the input phrase, and other such processing can be part of the feature extraction process 406. In another example, Word2vec or similar tools that produces word embeddings can be utilized to produce training vectors from the example utterances. When trained with a corpus of text, Word2vec produces a vector space where words are assigned positions in the vector space in a manner where words that share common context (such as being semantically similar) are positioned in proximity to one another. The Word2vec tools, methods, and variants thereof are well known and need not be discussed further here.

In some instances, the example utterances 402 are annotated, meaning that the example utterances and have identified intents and/or entities that are associated with the example utterance. When example utterances 402 are annotated, feature extraction method 406 can use the annotations to extract appropriate features, can encode the annotations into the resultant training vector 410, and/or combinations thereof.

The resultant training data set 414 can be used to train a language understanding model to identify intents and/or entities associated with an utterance when the utterance is submitted without prior dialog context.

To train a language understanding model to identify intents and/or entities associated with an utterance when the utterance is submitted with prior dialog context, utterance-context pairs are used. The process of assembling utterance-context pairs is discussed in greater detail below. However, in summary, an example utterance from a set of example utterances 402 is associated with an example prior dialog context from a set of example prior example contexts 404. The pair can be put through a feature extraction process 408 that operates substantially the same as feature extraction process 406 discussed above. The resultant output of feature extraction process 408 is a training vector 412 that is associated with the corresponding utterance-context pair. The training vectors 412 can be collected into a training data set 416 and used to train a language understanding model to recognize intents and/or entities as described herein.

Figure 5:
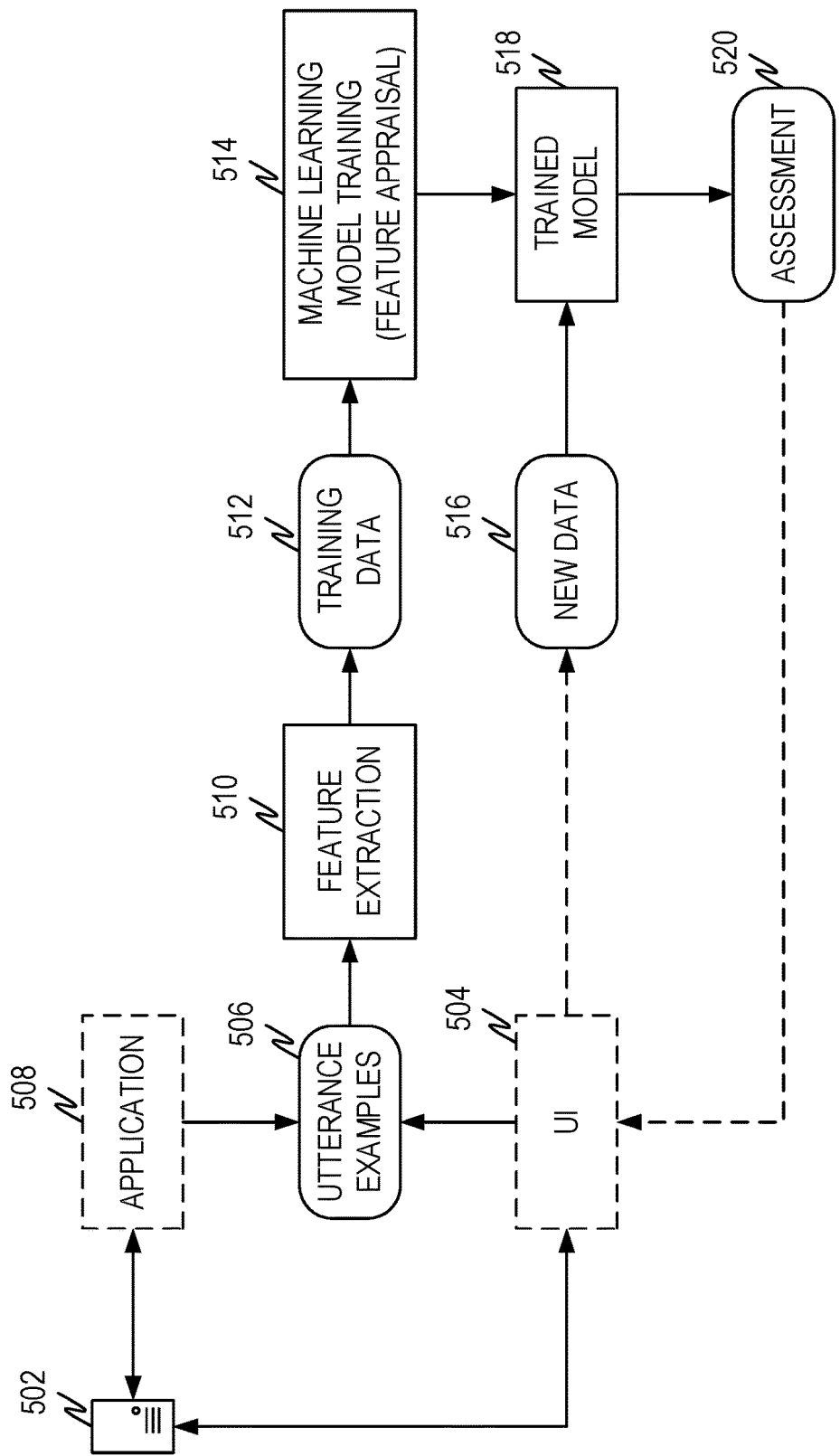
FIG. 5 illustrates a representative architecture for training a machine learning model according to some aspects of the present disclosure.
Figure 6:
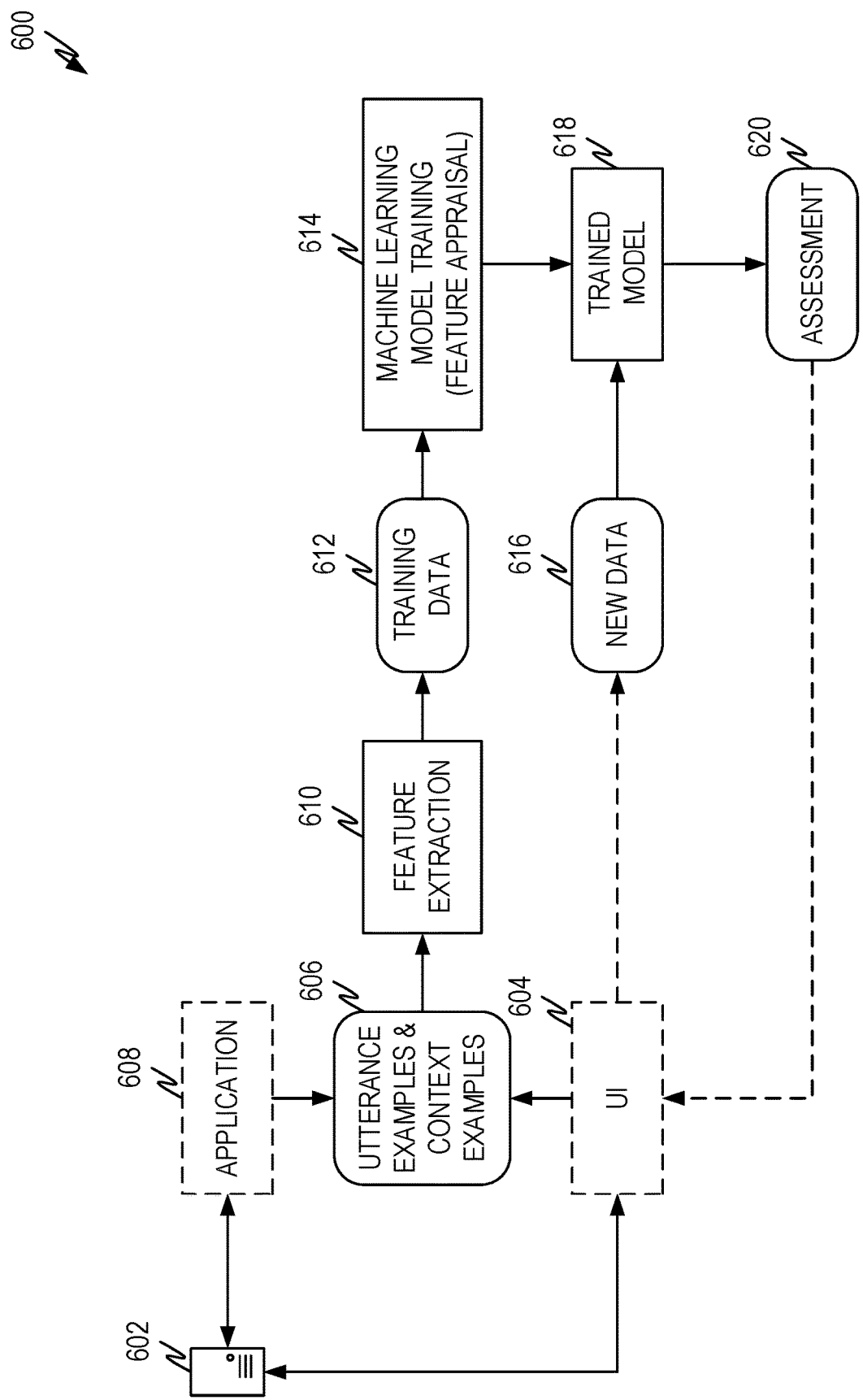
FIG. 6 illustrates a representative architecture for training a machine learning model according to some aspects of the present disclosure.

FIG. 5 and FIG. 6 illustrates a representative architecture for training a machine learning model according to some aspects of the present disclosure. FIG. 5 illustrates training a machine learning model for example utterances while FIG. 6 illustrates training a machine learning model for example utterance-context pairs.

Turning first to FIG. 5, example utterances 506 are collected. The example utterances 506 are the example utterances that will be used to train the machine learning model of the language understanding model. After training, the language understanding model will extract intents and/or entities as described herein.

There are numerous ways to collect a set of example utterances for training. In one embodiment, the example utterances are provided by the developer through a machine 502. For example, the developer can simply provide a complete set of example utterances 506.

In another embodiment, the example utterances are provided by one or more applications and/or services 508. For example, applications and/or services 508 can monitor what users enter and collect the example utterances for initial training and/or updating of the language understanding model. In some instances, criteria can be used to collect example utterances. For example, the applications and/or services 508 can monitor the output of the language understanding model while the dialog system is in use and when the language understanding model is unable to identify an intent and/or entity associated with an utterance. This can be determined, for example, when the scores associated with the intents and/or entities identified in an utterance fall below a designated threshold. For example, if the user enters an utterance and the top scoring intent and/or entity has a score that falls below a threshold, the application and/or services 508 can capture the utterance for use in training.

Figure 7:
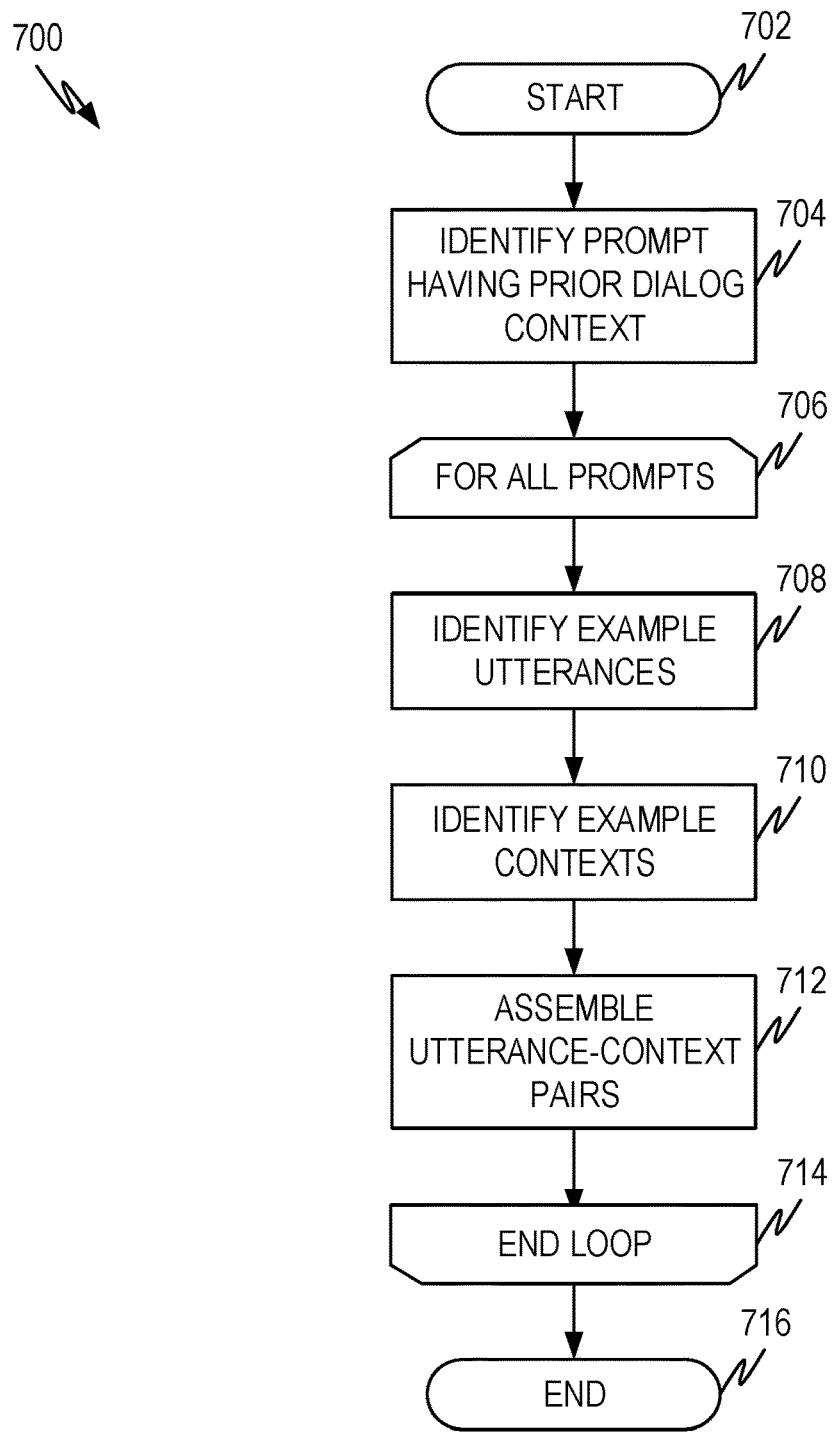
FIG. 7 illustrates a representative flow diagram for deriving training data according to some aspects of the present disclosure.

The application and/or services 508 can be the dialog system itself, another system, application and/or service, and/or any combination thereof. FIG. 7, discussed below, can be representative of a mechanism that helps extract information from a dialog system, either in a fully automated way, or in a developer assisted way, and/or some combination thereof, in order to collect example utterances and/or utterance-context pairs (as illustrated in FIG. 6).

In yet another example, the example utterances can be collected from the developer in an interactive manner. For example, a user interface 504 can be presented to the developer that allows the developer to enter example utterances, annotate example utterances, initiate training of the model, run test cases to see how the trained model performs, and control other aspects of example utterance collection, model training, and/or model training evaluation. An example of this type of embodiment is discussed below, along with a set of representative APIs that can be used to collect information and interact with a system that stores example utterances (506) and/or example utterance-context pairs (606) in order to train an appropriate model.

Once a set of example utterances 506 are collected, a feature extraction process 510 extracts features to create a set of training data 512. Feature extraction was discussed above in conjunction with FIG. 4.

In some example embodiments, different machine-learning tools may be used. The language understanding model can be set up as either a classification problem or a matching problem. In the classification problem approach, the training data is used with an appropriate machine learning model to train the model to recognize intents and/or entities from utterances and/or features extracted from utterances. In the matching problem approach, the training data is used with an appropriate machine learning mode to train the model to select the matching intents and/or entitles associated with an utterances and/or features extracted from utterances.

For classification type systems example machine learning models include, but are not limited to, Logistic Regression (LR), Naive-Bayes, Random Forest (RF), neural networks (NN), matrix factorization, and Support Vector Machines (SVM) tools. For matching type systems, some form of neural network (e.g., Long Short Term Memory, bi-directional Long Short Term Memory, etc.) is generally used to encode both the utterance and candidate intents and/or entities and a matching score determined between the encoded utterance and encoded candidate intents/entities. The intent and/or entities with the highest matching score are selected. The machine learning models for both classification type problems and for matching type problems are known and any such models can be utilized with embodiments of the present disclosure.

The machine-learning algorithms utilize the training data 512 to find correlations among the identified features that affect the outcome or assessment 520. In some example embodiments, the training data 512 includes annotated data (also referred to as labeled data), which is known data for one or more identified features and one or more outcomes, such as the intents and/or entities associated with an example utterance.

With the training data 512, the machine learning model of the language understanding model is trained at operation 514. The training process 514 appraises the value of the features as they correlate to the training data 512 and the associated intents and/or entities. This is typically done by minimizing an error function. Training of the various machine learning models is known and need not be further discussed here. The result of the training is the trained language understanding model 518.

When the trained language understanding model 518 is used to perform an assessment, new data 516 (e.g., a new utterance) is provided as an input to the trained language understanding model 518, and the language understanding model 518 generates the assessment 520 as output. In this case the assessment 520 are the intents and/or entities associated with the input utterance 516.

FIG. 6 illustrates the same process using utterance-context pairs rather that utterances. Thus, the description of FIG. 5, mulatis mutandis, applies to FIG. 6.

There are several ways to collect the utterance-context pairs (606) in order to produce the training data. FIG. 7 illustrates a representative flow diagram 700 for deriving training data according to some aspects of the present disclosure. This flow diagram is an example method of how to collect utterance-context pairs to be used training a language understanding model as described herein.

The method begins at operation 702 and proceeds to operation 704 where prompts having prior dialog contexts are identified. As discussed in conjunction with FIG. 2, dialog systems have or build a conversation network map during the course of a dialog. Prompts displayed by a dialog system to a user are programmed by a developer, created during operation of the dialog system, and/or some combination thereof. Each prompt can be designed to convey information to a user, elicit a response from a user, or both. Thus, prompts can be seen as steps in a dialog to begin the dialog, continue the dialog, and/or end the dialog.

Those prompts that are part of a dialog are those that are likely to benefit from prior dialog context. Thus, if a dialog system has a set of prompts that are part of a given dialog, collecting the prompts can be part of the implementation of operation 704. For example, if the dialog system has a set of pre-determined prompts and/or prompts that are created during runtime (e.g., using a set of conditions, rules, and/or so forth), operation 704 can collect such prompts from information utilized by the dialog system, such as data structures where such prompts are stored, conditions, rules, and/or so forth where prompts are retrieved and/or created. As another example, if the dialog system creates prompts dynamically during run time, the prompts can be collected during run time and later retrieved by operation 704. As yet another example, a developer can input the set of prompts, such as through an interactive user interface. As still another example, a developer can input the set of prompts in a batch. Other mechanisms can also be used to collect a set of prompts that have associated prior dialog context.

As a representative example, consider a simple book a flight dialog that may contain several prompts that are part of the dialog. For example, suppose in order to complete booking of a flight, a dialog system is programmed to accomplish the booking in several steps:
1) Gather the information needed to present travel choices to the user. Such information includes:
   a. Dates of travel (beginning and end)
   b. Starting airport
   c. Ending airport
   d. Any additional information the user wishes to provide to narrow the search criteria such as:
      i. Preferred airline(s)
      ii. Desired class of service (economy, business class, etc.)
      iii. Preferred seating
      iv. Preferred travel times
      v. and/or so forth
2) Once the basic travel information is gathered, the system does a search for flights and presents the user with flight options.
3) Based on user selection of desired flights, collect information needed to complete the booking:
   a. Persons traveling
   b. Traveler details (full name, passport number, etc.)
   c. Payment information
   d. and/or additional information that may be desired and/or needed
4) complete the booking In this representative example, step 1 is completed before step 2 and so forth, although one of the strengths of dialog systems is that they can be flexible in terms of such orders.

These different steps can be represented as rules, dialog flows, nodes in a conversation map, or in any other way. The dialog system will utilize one or more of these representations to present dialog prompts to gather the needed information, create dialog prompts to gather the needed information, and/or a combination thereof.

To see how the prompts with prior dialog context can be collected (e.g., operation 704) from the information above, consider a conversation map that is created from the steps. In this example, step 1 must be completed before step 2 is accomplished. Step 1 will be entered based on an entered initial utterance such as "I need to travel for business next week." The initial utterance may or may not have one or more of the needed entities 1:a-c. Thus, an utterance that results in the identified intent "BookFlight" will initiate step 1. Since at a minimum of the data for the entities in step 1:a-c must be collected before step 1 can be marked as complete and step 2 started, the system will utilize prompts to collect information from the user until the entities in 1:a-c are known. Thus, one or more prompts will be associated with 1:a-c in order to gather the needed information. For example, a simple set of prompts may include the following:

TABLE 1

| Entity | Example Prompts<br>Associated Prompts |
|---|---|
| Dates of travel<br>(beginning and ending) | "When would you like to travel?"<br>(if no travel dates have been entered)<br>"When would you like to leave?"<br>(if an ending date has been entered but no beginning date is known)<br>"When would you like to return?"<br>(if a beginning date has been entered but no ending date is known) |
| Starting Airport | "What airport would you like to leave from?" |
| Ending Airport | "Where are you traveling to?" |

Of course, more complicated set of prompts may be used by a dialog system, such as asking for source and destination cities and only asking for clarification on the airport if more than one exist or simply searching for flights to all airports serving the city. The prompts may change depending on the initial utterance in some embodiments.

The prompts in operation 704 can be directly collected from the information in the dialog system, collected during runtime and later utilized as described herein, and/or identified in another way. As an alternative, an interactive user interface can be collected through interaction with the developer. For example, the system may identify entities 1a-c as being required and the system can prompt the developer for various prompts that can be presented to the user in order to gather the entity information. Other ways such as a batch upload and so forth can be used to collect the various prompts.

An example of an interactive embodiment for collecting examples and interacting with a model training system is presented below.

Operation 706 begins a loop that considers each prompt in the set collected in operation 704 in turn.

Operation 708 identifies one or more example utterances that a user might enter in response to the prompt under consideration. For example, if the prompt is part of a dialog to book a flight such as "when would you like to travel?" operation 708 would identify possible responses a user may enter. For example, a user may enter responses such as:
Tuesday
I would like to leave on Wednesday and return next Monday
Leave on the 15$^{th}$ and return on the 21$^{st}$
The first day of spring break
Thus, each prompt in table 1 may give rise to a number of associated utterances.

Operation 708 can collect the example utterances that a user might enter in response the prompt under consideration in several ways. For example, in an interactive context, the prompt may be displayed to a developer and the developer asked to enter one or more example utterances that a user may enter in response to the prompt. These can be collected by operation 708. In another example, during operation the dialog system, or another service/system, or a combination thereof can collect user responses to prompts and the data can be mined by operation 708 to extract example utterances associated with the prompt under consideration. Other options such as a developer entering example utterances in a batch can also be utilized.

Operation 710 identifies example prior dialog contexts for each of the example utterances. In some embodiments, the system examines the prompt under consideration and creates example contexts from dialog information associated with the prompt. For example, the prompt under consideration will either be part of no dialog or part of a dialog. In the case where the prompt is part of no dialog, the system can treat the prompt as having no prior dialog context, or can identify a prior dialog context by querying the developer, or identify a prior dialog context in some other fashion.

In the case where the prompt is part of a dialog, the dialog itself may be associated with an intent. For example, a prompt of "where do you want to travel" that is part of a flight booking dialog can be associated with the "BookFlight" intent. In such a situation, the intent can be extracted from dialog metadata, the dialog data store, or other location where the intent associated with the dialog can be found. Similarly, other prompts in the dialog may be mined for additional context data.

As a representative example of mining dialog data to discover prior dialog context, consider the conversation map of FIG. 2, where each node in the map has associated data (e.g., 212, 214, 216, 218) that contains the prompt. Collecting all the prompts can give prior dialog contexts in terms of intents and/or entities. Similarly, the information that causes the state transition (e.g., 218, 210) can be mined for representative example utterances. This can be an example of mining data stored, accessed, and/or created by a dialog system to identify example contexts associated with a prompt under consideration.

As yet another example, a user interface can be presented to the developer and the developer asked to provide example prior dialog contexts that are to be associated with prompt under consideration.

As yet another example, consider the booking a flight example above. Example prior dialog contexts can include one or more intents and/or one or more entities. In the booking a flight example above, step 1 is completed before step 2 is accomplished and so forth. A minimum of the data in step 1:a-c must be collected before step 1 can be marked as complete and step 2 started.

In one embodiment, the example context is simply the intent, BookFlight. In other embodiments various combinations of the entities in 1a-c can also be included in the example context. Unless the dialog system is designed so that users have to enter data in a particular order, the example contexts can account for entry of the entities in any order and all combinations can be used as example prior contexts. For example, assuming that order of previously entered entities do not matter, prior dialog context can comprise the intent and any combination of entities. In this case, the intent is BookFlight and the entities can be BeginTravelDate, EndTravelDate, SourceAirport, and/or DestinationAirport in any combination. Thus, prior context expressed in expressed in an intent.entities format can include:

(1) BookFlight.BeginTravelDate
(2) BookFlight.EndTravelDate
(3) BookFlight.SourceAirport
(4) BookFlight.DestinationAirport
(5) BookFlight.BeginTravelDate.EndTravel Date
(6) BookFlight.BeginTravelDate.SourceAirport
(7) BookFlight.BeginTravelDate.DestinationAirport
(8) BookFlight.EndTravelDate.SourceAirport
(9) BookFlight.EndTravelDate.DestinationAirport
(10) BookFlight.SourceAirport.DestinationAirport
(11) BookFlight.BeginTravelDate.EndTravelDate.SourceAirport
(12) BookFlight.BeginTravelDate.EndTravelDate.DestinationAirport
(13) BookFlight.BeginTravelDate.SourceAirport.DestinationAirport
(14) BookFlight.EndTravelDate.SourcAirport.DestinationAirport Along with the intent alone, each of these can represent a prior example context that is identified in operation 710.

In operation 712 utterance-context pairs are assembled. To create the utterance-context pairs, a context is paired with the utterances that are designed to elicit the information not already represented by the prior dialog context. For example, if the prior dialog context is "BookFlight", the example utterances that are given in response to the prompts of Table 1 above can be paired with the intent BookFlight. For contexts that have associated entities, the utterances are those that are given in response to entities that are not part of the context. For example, if the context is (4) on the list above (BookFlight.DestinationAirport), the utterances associated with the prompts designed to collect SourceAirport, BeginTravelDate, and EndTravelDate can be paired in combination. If the context is (14) on the list (BookFlight.EndTravelDate.SourcAirport.DestinationAirport), the only missing entity is BeginTravelDate, so the utterances associated with the prompt to collect BeginTravelDate are paired in combination with the context (14).

Operation 714 ends the loop for the prompts and the method ends at operation 716.

As discussed herein, one approach to gathering training examples, with or without prior dialog context is to allow a developer to interact with the system through a user interface such as shown in FIG. 5:504 and/or FIG. 6:604. The user interface can collect information and use APIs to store the information, such as according to the database schema of FIG. 8 or in another data store. Such an interactive approach can be particularly useful when the language understanding model is provided by an infrastructure, service, or some other type of platform that the developer's dialog system relies on.

The user interface (e.g., FIG. 5:504 and/or FIG. 6:604) can present options that allow a developer to enter an example, with or without prior dialog context, and then annotate and/or save the example. For example, the system can allow the developer to enter an example utterance, identify intents, entities, and/or prior dialog context associated with the utterance. Using the booking a flight example above, the developer can enter: "I need to travel for business next week" and identify the associated intent as BookFlight. Similarly, the user can enter "Book me a flight to Cairo next Tuesday" and identify the intent as BookFlight, the entity DestinationAirport as Cairo and the entity BeginTravelDate as Tuesday.

Similarly, prior dialog contexts can interactively be entered. For example, the user can enter "Friday" as the utterance and the prior dialog context as having the BookFlight intent and BeginTravelDate entity with a value of Tuesday.

In some embodiments, the interactivity can be assisted by the system. For example, if the training system was able to extract the prompts in Table 1 from the developer's dialog system (e.g., as part of operation 704), the training system can walk through each of the prompts and allow the user to enter example utterances against each of the prompts (e.g., as part of operation 708). The user can then identify example prior dialog contexts through the user interface as well for the different example utterances entered.

The interactive entry of example utterances and/or example utterance-context pairs can also be accompanied by an interactive loop through the training methodology outlined in FIGS. 5 and 6. For example the user can enter one or more example utterances and/or utterance-context pairs as described, the feature extraction (510, 610) can extract the training data (512, 612), the model can be trained and/or updated (514, 614). The user can then enter a test utterance and/or utterance-context pair (516, 616), and the test utterance and/or utterance-context pair evaluated by the trained model (518, 618) and the resulting assessment (520, 620) presented to the developer through the user interface (504, 604). The developer can then add annotations to correct any errors made by the model and the annotated correction be used to further update the model.

Selecting and Using Trained Models

Figure 8:
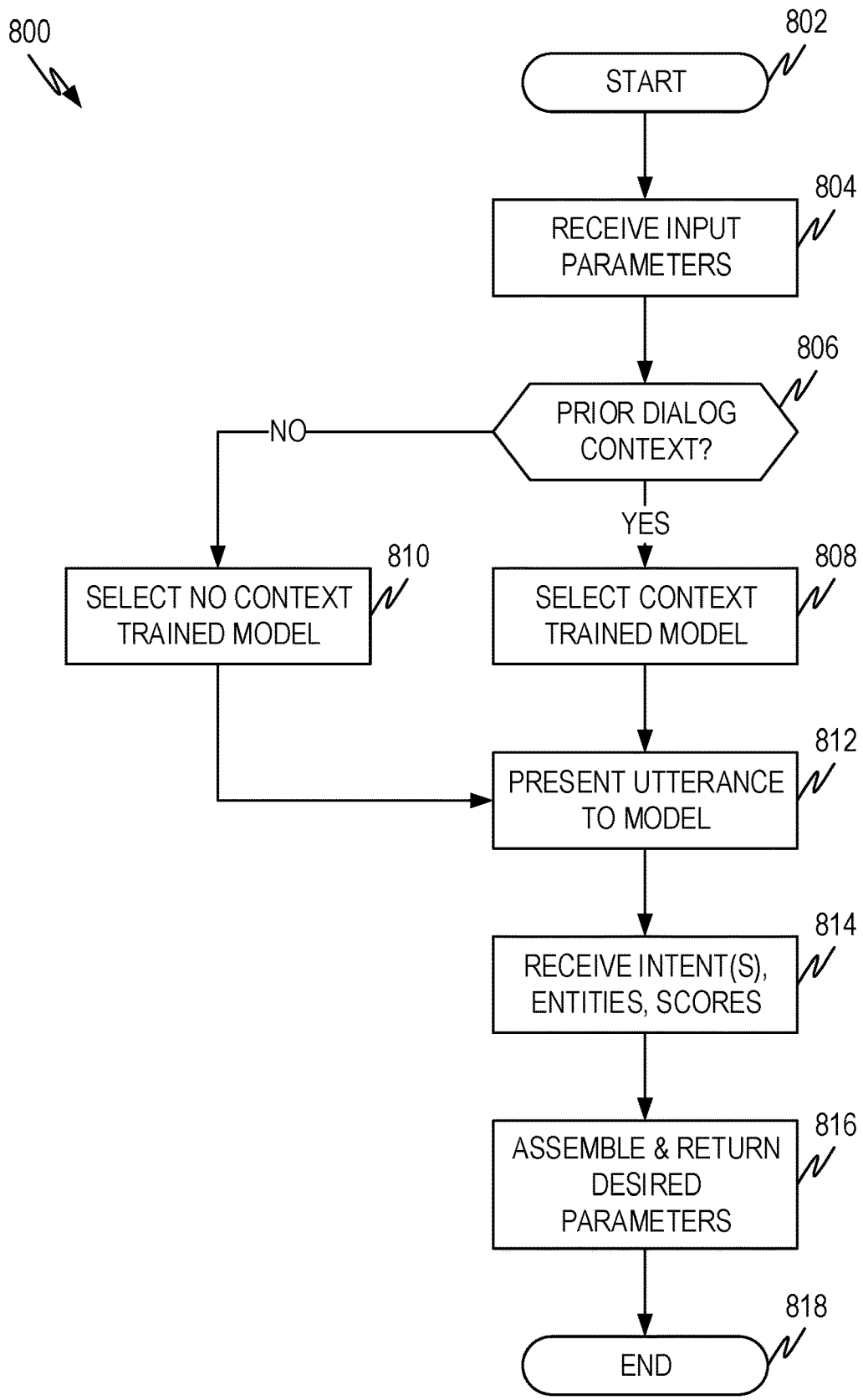
FIG. 8 illustrates a representative flow diagram for selecting and utilizing a trained machine learning model according to some aspects of the present disclosure.

FIG. 8 illustrates a representative flow diagram 800 for selecting and utilizing a trained machine learning model according to some aspects of the present disclosure. The trained machine learning models are those trained as part of the language understanding models as described herein. The process is performed, for example, by the language understanding model in some embodiments.

The process begins at 802 and proceeds to 804 where input parameters are received from the dialog system. The input parameters can comprise the input utterance and (optional) prior dialog context. Because the dialog system may or may not present prior dialog context (even when such is available), the language understanding model needs to accommodate scenarios where prior dialog context is received along with an input utterance and scenarios where no prior dialog context is received and only an input utterance is received.

As noted above, one way to accommodate both scenarios is to train two machine learning models, one on utterance-context pairs and one only on utterances. This is the embodiment illustrated in FIG. 8. In another embodiment, only a single machine learning model is used, which has been trained using both the utterance only training data and the utterance-context pair training data.

Operation 806 determines whether prior dialog context has been received along with the utterance or only an utterance without any prior dialog context. Responsive to the prior dialog context having been received, execution proceeds to operation 808 where the model trained on utterance-context pairs is selected. If only an utterance without any prior dialog context is received, execution proceeds to operation 810 where the model trained only on utterances is selected.

The input (e.g., utterance or utterance/prior dialog context) is presented to the selected, trained machine learning model in operation 812. In response, the model returns intents, entities, and related scores as desired. For example, the model can be trained to return a score associated with all possible intents and/or any identified entities along with their respective scores. As discussed herein, the scores represent the likelihood that the associated intent and/or entity is represented in the input utterance.

In operation 816 the desired parameters are assembled and returned to the dialog system. The dialog system may want all the intents/entities and associated scores, or may want only the top scoring intents and/or entities. For example a "verbose" set of parameters returned to the dialog system may look something like:

```
{
    "query": "Book me a flight to Cairo",
    "topScoringIntent": {
        "intent": "BookFlight",
        "score": 0.9887482
    },
    "intents": [
        {
            "intent": "BookFlight",
            "score": 0.9887482
        },
        {
            "intent": "None",
            "score": 0.04272597
        },
        {
            "intent": "LocationFinder",
            "score": 0.0125702191
        },
        {
            "intent": "Reminder",
            "score": 0.00375502417
        },
        {
            "intent": "FoodOrder",
            "score": 3.765154E-07
        },
    ],
    "entities": [
        {
            "entity": "cairo",
            "type": "Location",
            "startIndex": 20,
            "endIndex": 24,
            "score": 0.956781447
        }
    ]
}
```

On the other hand, a "top scoring" result may be something like:

```
{
    "query": "Book me a flight to Cairo",
    "topScoringIntent": {
        "intent": "BookFlight",
        "score": 0.9887482
    },
    "entities": [
        {
            "entity": "cairo",
            "type": "Location",
            "startIndex": 20,
            "endIndex": 24,
            "score": 0.956781447
        }
    ]
}
```

Example Machine Architecture and Machine-Readable Medium

Figure 9:
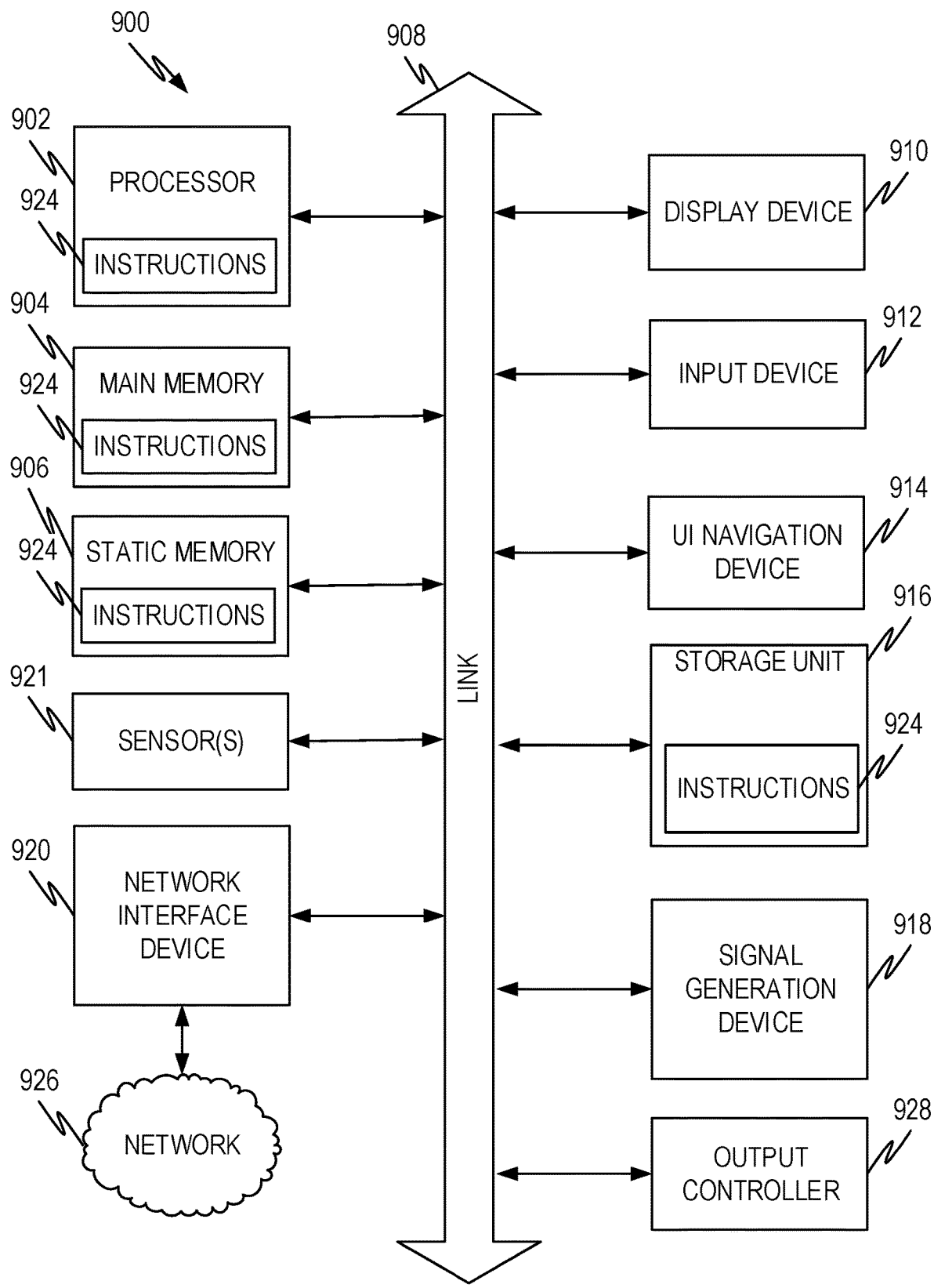
FIG. 9 illustrates a representative architecture for implementing the systems and other aspects disclosed herein or for executing the methods disclosed herein.

FIG. 9 illustrates a representative machine architecture suitable for implementing the systems and so forth or for executing the methods disclosed herein. The machine of FIG. 9 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 9 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also betaken to include any collection of machines that individually or jointly execute a set (or multiple sets) of instructions to perform any one or more of the methodologies discussed herein.

The example of the machine 900 includes at least one processor 902 (e.g., a central processing unit (CPU), a graphics processing unit (GPU), advanced processing unit (APU), or combinations thereof), one or more memories such as a main memory 904, a static memory 906, or other types of memory, which communicate with each other via link 908. Link 908 may be a bus or other type of connection channel. The machine 900 may include further optional aspects such as a graphics display unit 910 comprising any type of display. The machine 900 may also include other optional aspects such as an alphanumeric input device 912 (e.g., a keyboard, touch screen, and so forth), a user interface (UI) navigation device 914 (e.g., a mouse, trackball, touch device, and so forth), a storage unit 916 (e.g., disk drive or other storage device(s)), a signal generation device 918 (e.g., a speaker), sensor(s) 921 (e.g., global positioning sensor, accelerometer(s), microphone(s), camera(s), and so forth), output controller 928 (e.g., wired or wireless connection to connect and/or communicate with one or more other devices such as a universal serial bus (USB), near field communication (NFC), infrared (IR), serial/parallel bus, etc.), and a network interface device 920 (e.g., wired and/or wireless) to connect to and/or communicate over one or more networks 926.

Executable Instructions and Machine-Storage Medium

The various memories (i.e., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-storage medium," "device-storage medium," "computer-storage medium"

mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices: magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall betaken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A method for language recognition, comprising:
receiving an input utterance;
determining whether prior dialog context information was received in conjunction with the input utterance:
responsive to determining that prior dialog context information was received:
selecting a first trained language understanding model;
determining a first intent from the input utterance and the prior dialog context information using the first trained language understanding model:
returning the first intent;
responsive to determining that prior dialog context information was not received:
selecting a second trained language understanding model;
determining a second intent from the input utterance using the second trained language understanding model;
returning the second intent.

Example 2

The method of claim 1 further comprising:
responsive to determining that prior dialog context information was received:
determining a first entity from the input utterance using the first trained language understanding model; and
returning the first entity along with the first intent.

Example 3

The method of claim 1 or 2 further comprising:
responsive to determining that prior dialog context information was not received:
determining a second entity from the input utterance using the second trained language understanding model; and
returning the second entity along with the second intent.

Example 4

The method of claim 1, 2, or 3 wherein:
the first trained language understanding model is trained using example utterances and associated prior dialog context; and
the second trained language understanding model is trained using example utterances without associated prior dialog context pairs.

Example 5

The method of claim 1, 2, 3, or 4 further comprising:
receiving a plurality of example utterances;
identify at least one example prior dialog context;
creating a plurality of utterance-context pairs, each pair comprising an example utterance and an example dialog context;
extracting a first set of features from the utterance-context pairs; and
training the first language understanding model with training data comprising the first set of features.

Example 6

The method of claim 5 further comprising:
extracting a second set of features from the example utterances; and
training the second language understanding model with training data comprising the second set of features.

Example 7

The method of claim 5 wherein the plurality of example utterances is derived from requests used by a dialog system to elicit entity information from a user.

Example 8

The method of claim 7 wherein the at least one example prior dialog context comprises at least one intent and wherein the entity information is associated with the at least one intent.

Example 9

The method of claim 1, 2, 3, 4, 5, 6, 7, or 8 further comprising:
responsive to determining that prior dialog context information was received:
determining a first likelihood score associated with the first intent using the first trained language understanding model;
determining a third intent and an associated likelihood score using the first trained language understanding model;

returning the first likelihood score along with the first intent and returning the third intent and its associated likelihood score along with the first intent and the first likelihood score.

Example 10

The method of claim 1, 2, 3, 4, 5, 6, 7, 8, or 9 further comprising:
responsive to determining that prior dialog context information was not received:
determining a second likelihood score associated with the second intent using the second trained language understanding model;
determining a fourth intent and an associated likelihood score using the second trained language understanding model:
returning the second likelihood score along with the second intent and returning the fourth intent and its associated likelihood score along with the second intent and the second likelihood score.

Example 11

The method of claim 1, 2, 3, 4, 5, 6, 7, 8, 9, or 10 further comprising determining a likelihood score associated with the first intent using the first language model.

Example 12

The method of claim 1, 2, 3, 4, 5, 6, 7, 8, 9, 10, or 11 wherein the first language model is selected from among a plurality of language models.

Example 13

The method of claim 1, 2, 3, 4, 5, 6, 7, 8, 9, 10, 11, or 12 wherein the second language model is selected from among a plurality of language models.

Example 14

An apparatus comprising means to perform a method as claimed in any preceding claim.

Example 15

Machine-readable storage including machine-readable instructions, when executed, to implement a method or realize an apparatus as claimed in any preceding claim.

Example 16

A method for language recognition, comprising:
receiving an input utterance:
determining whether prior dialog context information was received in conjunction with the input utterance;
responsive to determining that prior dialog context information was received:
selecting a first trained language understanding model;
determining a first intent from the input utterance and the prior dialog context information using the first trained language understanding model;
returning the first intent;
responsive to determining that prior dialog context information was not received:
selecting a second trained language understanding model;
determining a second intent from the input utterance using the second trained language understanding model;
returning the second intent.

Example 17

The method of claim 16 further comprising:
responsive to determining that prior dialog context information was received:
determining a first entity from the input utterance using the first trained language understanding model; and
returning the first entity along with the first intent.

Example 18

The method of claim 16 further comprising:
responsive to determining that prior dialog context information was not received:
determining a second entity from the input utterance using the second trained language understanding model; and
returning the second entity along with the second intent.

Example 19

The method of claim 16 wherein:
the first trained language understanding model is trained using example utterances and associated prior dialog context; and
the second trained language understanding model is trained using example utterances without associated prior dialog context pairs.

Example 20

The method of claim 16 further comprising:
receiving a plurality of example utterances:
identify at least one example prior dialog context:
creating a plurality of utterance-context pairs, each pair comprising an example utterance and an example dialog context;
extracting a first set of features from the utterance-context pairs; and
training the first language understanding model with training data comprising the first set of features.

Example 21

The method of claim 20 further comprising:
extracting a second set of features from the example utterances; and
training the second language understanding model with training data comprising the second set of features.

Example 22

The method of claim 20 wherein the plurality of example utterances is derived from requests used by a dialog system to elicit entity information from a user.

Example 23

The method of example 22 wherein the at least one example prior dialog context comprises at least one intent and wherein the entity information is associated with the at least one intent.

Example 24

The method of claim 16 further comprising:
responsive to determining that prior dialog context information was received:
determining a first likelihood score associated with the first intent using the first trained language understanding model;
determining a third intent and an associated likelihood score using the first trained language understanding model;
returning the first likelihood score along with the first intent and returning the third intent and its associated likelihood score along with the first intent and the first likelihood score.

Example 25

The method of claim 16 further comprising:
responsive to determining that prior dialog context information was not received:
determining a second likelihood score associated with the second intent using the second trained language understanding model;
determining a fourth intent and an associated likelihood score using the second trained language understanding model:
returning the second likelihood score along with the second intent and returning the fourth intent and its associated likelihood score along with the second intent and the second likelihood score.

Example 26

A system comprising a processor and computer executable instructions, that when executed by the processor, cause the system to perform operations comprising:
receiving a plurality of example utterances:
identify at least one example prior dialog context:
creating a plurality of utterance-context pairs, each pair comprising an example utterance and an example dialog context;
extracting a first set of features from the utterance-context pairs:
training a first language model with training data comprising the first set of features;
receiving an utterance:
determining whether prior dialog context was received along with the utterance;
responsive to determining that prior dialog context was received along with the utterance:
determining at least one intent based on the utterance and prior dialog context using the first language model; and
returning the at least one intent.

Example 27

The system of example 26 further comprising determining a likelihood score associated with each intent of the at least one intent using the first language model.

Example 28

The system of example 26 wherein further comprising:
responsive to determining that prior dialog context was received along with the utterance, selecting the first language model from among a plurality of language models.

Example 29

The system of example 26 wherein the at least one example prior dialog context comprises an intent and wherein the operations further comprise:
deriving the plurality of example utterances from requests used by a dialog system to elicit entity information from a user.

Example 30

The system of example 26 further comprising:
extracting a second set of features from the plurality of utterances; and
training a second language model with training data comprising the second set of features.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for language recognition, comprising:
receiving an input utterance;
identifying a first language understanding model trained on a plurality of utterance-prior dialog context pairs;
identifying a second language understanding model trained on a plurality of utterance without associated prior dialog context;
determining whether prior dialog context information was received in conjunction with the input utterance;
responsive to determining that prior dialog context information was received:
selecting the first trained language understanding model;
determining a first intent from the input utterance and the prior dialog context information using the first trained language understanding model;
returning the first intent;
responsive to determining that prior dialog context information was not received:
selecting the second trained language understanding model;
determining a second intent from the input utterance using the second trained language understanding model;
returning the second intent.

2. The method of claim 1 further comprising:
responsive to determining that prior dialog context information was received:
determining a first entity from the input utterance using the first trained language understanding model; and
returning the first entity along with the first intent.

3. The method of claim 1 further comprising:
responsive to determining that prior dialog context information was not received:
determining a second entity from the input utterance using the second trained language understanding model; and
returning the second entity along with the second intent.

4. The method of claim 1 further comprising:
receiving a plurality of example utterances;
identify at least one example prior dialog context;
creating a plurality of utterance-context pairs, each pair comprising an example utterance and an example dialog context;
extracting a first set of features from the utterance-context pairs; and
training the first language understanding model with training data comprising the first set of features.

5. The method of claim 4 further comprising:
extracting a second set of features from the example utterances; and
training the second language understanding model with training data comprising the second set of features.

6. The method of claim 4 wherein the plurality of example utterances is derived from requests used by a dialog system to elicit entity information from a user.

7. The method of claim 6 wherein the at least one example prior dialog context comprises at least one intent and wherein the entity information is associated with the at least one intent.

8. The method of claim 1 further comprising:
responsive to determining that prior dialog context information was received:
determining a first likelihood score associated with the first intent using the first trained language understanding model;
determining a third intent and an associated likelihood score using the first trained language understanding model;
returning the first likelihood score along with the first intent and returning the third intent and its associated likelihood score along with the first intent and the first likelihood score.

9. The method of claim 1 further comprising:
responsive to determining that prior dialog context information was not received:
determining a second likelihood score associated with the second intent using the second trained language understanding model;
determining a fourth intent and an associated likelihood score using the second trained language understanding model;
returning the second likelihood score along with the second intent and returning the fourth intent and its associated likelihood score along with the second intent and the second likelihood score.

10. The method of claim 1 further comprising:
determining whether the input utterance corresponds to an existing dialog or new dialog, wherein the input utterance corresponds to the existing dialog, the first language understanding model is used, or wherein the input utterance corresponds to the new dialog, the second language understanding model is used.

11. A system comprising a processor and computer executable instructions, that when executed by the processor, cause the system to perform operations comprising:
receiving a plurality of example utterances;
identify at least one example prior dialog context for each example utterance of the plurality of example utterances;
creating a plurality of utterance-context pairs, each pair comprising an example utterance and an example dialog context;
extracting a first set of features from the utterance-context pairs;
training a first language model with training data comprising the first set of features;
receiving an utterance;
extracting a second set of features from the plurality of example utterances;
training a second language model with training data comprising the second set of features;
determining whether prior dialog context was received along with the utterance;
responsive to determining that prior dialog context was received along with the utterance:
determining at least one intent based on the utterance and prior dialog context using the first language model; or
responsive to determining that no prior dialog context was received along with the utterance:
determining at least one intent based on the utterance using the second language model; and
returning the at least one intent.

12. The system of claim 11 further comprising determining a likelihood score associated with each intent of the at least one intent using the first language model.

13. The system of claim 11 wherein further comprising:
responsive to determining that prior dialog context was received along with the utterance, selecting the first language model from among a plurality of language models.

14. The system of claim 11 wherein the at least one example prior dialog context comprises an intent and wherein the operations further comprise:
deriving the plurality of example utterances from requests used by a dialog system to elicit entity information from a user.

15. The system of claim 11 further comprising:
extracting a second set of features from the plurality of utterances; and
training a second language model with training data comprising the second set of features.

16. The system of claim 15 further comprising:
responsive to determining that prior dialog context was not received along with the utterance:
determining at least one other intent based on the utterance using the second language model; and
returning the at least one other intent.

17. The system of claim 16 further comprising determining a likelihood score associated with each intent of the at least one other intent using the second language model.

18. The system of claim 16 further comprising:
responsive to determining that prior dialog context was not received along with the utterance:
determining at least one other entity based on the utterance and prior dialog context using the second language model; and
returning the at least one other entity along with the at least one other intent.

19. The system of claim 11 further comprising:
responsive to determining that prior dialog context was received along with the utterance:
determining at least one entity based on the utterance and prior dialog context using the first language model; and
returning the at least one entity along with the at least one intent.

20. A hardware computer storage medium comprising executable instructions that, when executed by a processor of a machine, cause the machine to perform operations comprising:

obtaining a set of prompts from a dialog system;
identifying at least one prompt from the set of prompts from the dialog system that the dialog system uses to elicit the at least one example utterance from a user of the dialog system;
identifying example utterances that the user may enter when prompted by the at least one prompt;
identify an example intent for each of the example utterances;
identify at least one example entity associated with each example intent;
creating a plurality of example utterance-dialog context pairs, each example utterance-dialog context pairs comprising an example utterance and either the example intent, an example entity associated with the example intent along with an associated example entity, or the example intent and the example entity associated with the example intent;
extracting a set of features from the plurality of example utterance-dialog context pairs; and
training a language understanding model with training data comprising the set of features.

* * * * *